B. ASKEW.
COTTON CHOPPER.
APPLICATION FILED MAY 7, 1915.

1,174,538.

Patented Mar. 7, 1916.
2 SHEETS—SHEET 1.

Ben Askew, Inventor,

By N. L. S. Constan
Attorney

Witnesses:

B. ASKEW.
COTTON CHOPPER.
APPLICATION FILED MAY 7, 1915.
1,174,538.
Patented Mar. 7, 1916.
2 SHEETS—SHEET 2.
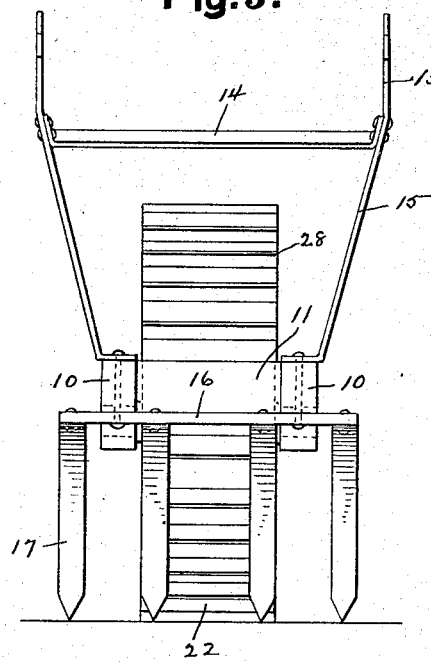
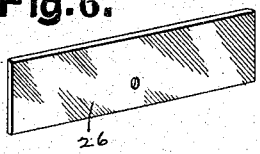
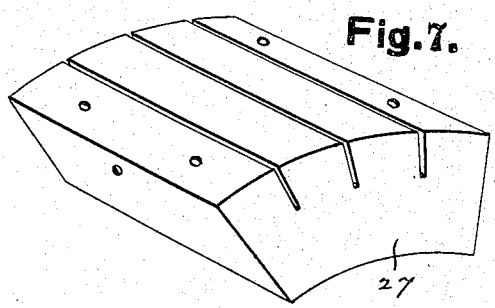
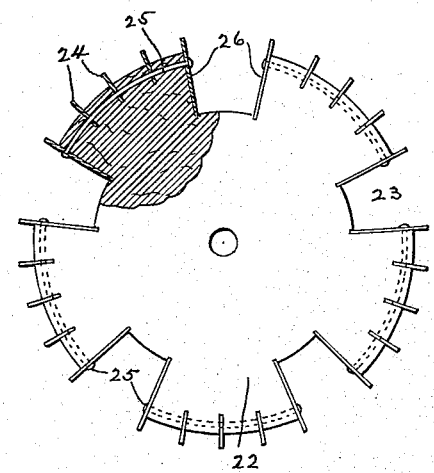
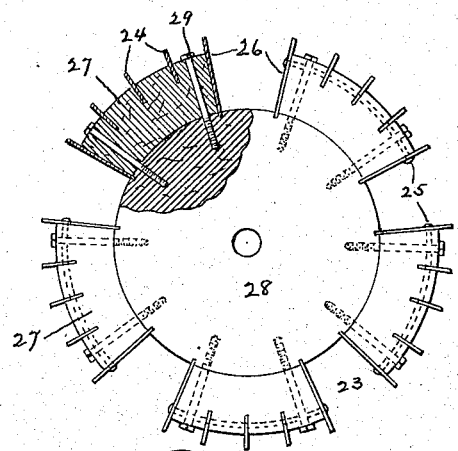
Ben Askew Inventor,
By W. L. S. Crouton
Attorney
Witnesses:

UNITED STATES PATENT OFFICE.

BEN ASKEW, OF ATLANTA, GEORGIA, ASSIGNOR OF ONE-HALF TO DAVID T. HOWARD, OF ATLANTA, GEORGIA.

COTTON-CHOPPER.

1,174,538.  Specification of Letters Patent.  Patented Mar. 7, 1916.

Application filed May 7, 1915. Serial No. 26,673.

*To all whom it may concern:*

Be it known that I, BEN ASKEW, a citizen of the United States, residing at Atlanta, in the county of Fulton and State of Georgia, have invented certain new and useful Improvements in Cotton-Choppers, of which the following is a specification.

This invention relates to cotton choppers or blockers.

The object of the invention is to enable any one of ordinary mechanical ability to construct a machine of the above character that shall be thoroughly effective in use, and easy to repair in case of damage or from deterioration incident to active employment.

A further object is to improve the manner of assembling the chopping knives with the wheel, whereby to permit the former to be readily detached when rendered necessary or desirable, and as easily replaced.

With the above and other objects in view, as will appear as the nature of the invention is better understood, the same consists in the novel arrangement and combination of parts of a cotton chopper as will be hereinafter fully described and claimed.

Figure 1:
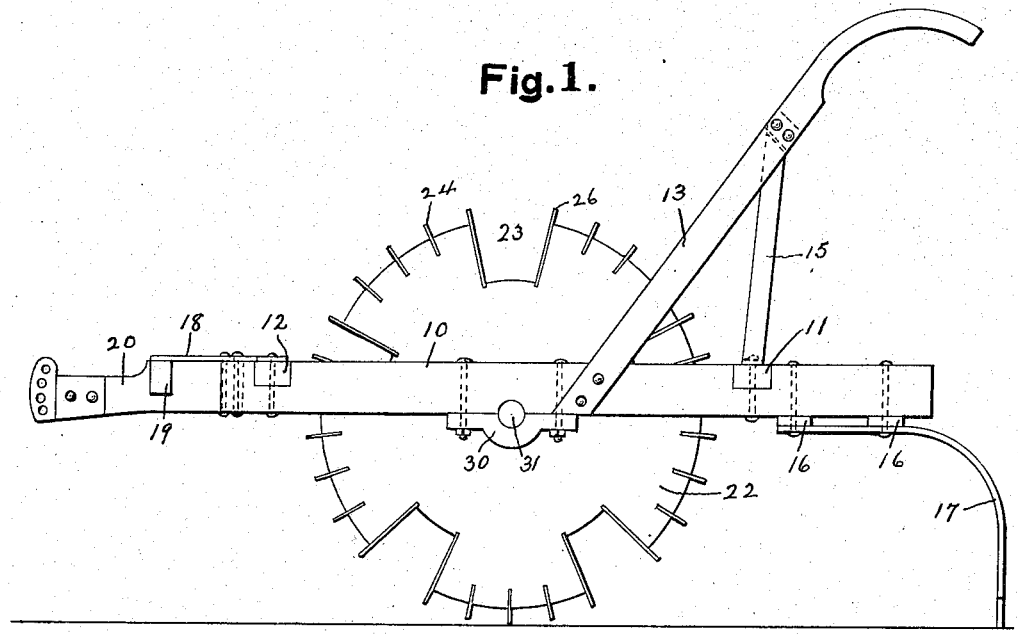
Figure 2:
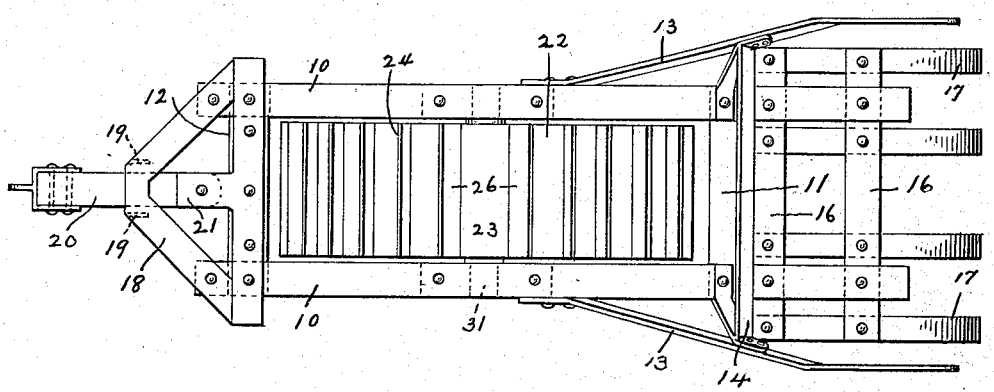

In the accompanying drawings forming a part of this specification and in which like characters of reference indicate corresponding parts: Figure 1 is a view in side elevation of one form or embodiment of the invention. Fig. 2 is a top plan view of Fig. 1. Fig. 3 is a rear elevation of Fig. 1. Figs. 4 and 5 are detail views in elevation, partly in section of modified forms of the chopping wheel. Fig. 6 is a perspective detail view of one of the chopping knives. Fig. 7 is a perspective detail view of one of the detachable wheel segments or knife carriers shown as employed in conjunction with the wheel exhibited in Fig. 5.

The frame of the machine shown in Figs. 1, 2 and 3 comprises two longitudinal beams 10, and two cross beams 11 and 12 connecting, and disposed adjacent to the ends of the beams 10. Each beam 10 has secured to it preferably at its outer side, a handle bar 13, the two bars being transversely connected and braced by a bar 14, and vertically stayed by rods 15 bolted at their upper and lower ends respectively to the handle bars and to the cross beam 11 and beams 10, as clearly shown in Fig. 1.

Secured to the under side of the beams 10 in rear of the beam 11 are two cross plates 16 to which are bolted downwardly curved spring-raker teeth 17, of which any number may be employed, and which operate in the usual manner to gather the chopped stalks and bolls, and also to cultivate the soil.

Bolted to upper surface of the forward ends of the beams 10 is a substantially triangular plate 18, the apex of which is disposed outward from the beam ends and is provided with two downward projecting spaced lugs 19, between which is disposed the intermediate portion of a clevis bar 20 and which is limited in lateral movement by the lugs, the rear end of which is pivoted to a central extension 21 of the plate 18. By thus combining the clevis bar with the frame, the former will be prevented from having too great a swing under horse motion, so that proper operation of the cutting wheel, now to be described will be assured with the result that proper blocking of the plants will be secured.

The chopping wheel shown in Figs. 1, 2 and 3 and designated generally 22 may be constructed of built-up stock, such as suitably assembled disks of wood provided with any desired number of peripheral notches or recesses constituting pockets 23 to receive the plants to be conserved. The peripheries of the wheel segments are provided with inset knives 24 which are held in position, preferably by frictional engagement, with the walls of their seats, or as shown in Fig. 4 by curved bolts 25, which latter also serve to secure in place the knives 26 that face the walls of the pockets 23. Instead of having the wheel segments integral with the wheel as described, these segments 27, as shown in Figs. 5 and 7, may be made as separate elements and secured to the wheel proper 28 by radial bolts 29. This latter arrangement possesses the great advantage of enabling the substitution of one or more segments without discarding the entire wheel which might be necessary where the wheel and segments constitute an integral structure. To combine the wheel with the beams 10, the latter are provided with bearings 30 in which are journaled the terminals of a shaft 31 carried by the wheel. In operation, as the machine is drawn over the ground, the knives 24 and 26 will cut down the superfluous plants, thus thinning the rows, while those plants to be conserved are received in the pockets 23 and thus shielded from injury. At the same time the rakers will work the soil and thus cultivate it.

Having thus described the invention, what is claimed is:

The combination with a frame of a chopping wheel provided with spaced detachable segments defining pockets, knives inset in the segments, knives carried by the opposed walls of the pockets, and curved bolts passing through the segments and series of knives.

In testimony whereof I affix my signature in presence of two witnesses.

BEN ASKEW.

Witnesses:
H. L. JOHNSON,
ANNIE M. CHETU.

Copies of this patent may be obtained for five cents each, by addressing the "Commissioner of Patents, Washington, D. C."